US010445910B2

(12) United States Patent
Tanaka et al.

(10) Patent No.: US 10,445,910 B2
(45) Date of Patent: Oct. 15, 2019

(54) GENERATING APPARATUS, GENERATING METHOD, AND NON-TRANSITORY COMPUTER READABLE STORAGE MEDIUM

(71) Applicant: YAHOO JAPAN CORPORATION, Tokyo (JP)

(72) Inventors: Tomohiro Tanaka, Tokyo (JP); Naoaki Yamashita, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 246 days.

(21) Appl. No.: 15/455,711

(22) Filed: Mar. 10, 2017

(65) Prior Publication Data
US 2017/0345196 A1  Nov. 30, 2017

(30) Foreign Application Priority Data

May 27, 2016  (JP) .................................. 2016-106559

(51) Int. Cl.
*G06T 11/60* (2006.01)
*G06T 5/50* (2006.01)

(52) U.S. Cl.
CPC ................ *G06T 11/60* (2013.01); *G06T 5/50* (2013.01); *G06T 2207/20084* (2013.01)

(58) Field of Classification Search
None
See application file for complete search history.

(56) References Cited

U.S. PATENT DOCUMENTS

2009/0208118 A1*  8/2009  Csurka ............... G06K 9/00664
                                                  382/228
2017/0083752 A1*  3/2017  Saberian .................. G06T 3/40
2017/0236287 A1*  8/2017  Shen .................... G06K 9/6269
                                                  382/206

OTHER PUBLICATIONS

Liu et al. "Optimizing Photo Composition", Computer Graphics Forum, The Eurographics Association and Blackwell Publishing Ltd, 2010.
Simonyan et al. "Deep Inside Convolutional Networks: Visualising Image Classification Models and Saliency Maps", pp. 1-8, 2014.
Denil et al. "Extraction of Salient Sentences from Labelled Documents", pp. 1-9, 2015.
Zhang et al. "Salient Object Subitizing", The IEEE Conference on Computer Vision and Pattern Recognition (CVPR) pp. 4045-4054, 2015.

* cited by examiner

Primary Examiner — David Perlman
(74) Attorney, Agent, or Firm — Oliff PLC (57) ABSTRACT

A generating apparatus according to an embodiment of the present application includes an obtaining unit and a generating unit. The obtaining unit obtains intermediate images in an intermediate layer of a neural network that recognizes the quantity of objects contained in an image. The generating unit generates a combination image by combining together the intermediate images obtained by the obtaining unit. For example, the generating unit generates the combination image by combining together the intermediate images to which a weight has been applied on the basis of a change in the recognition of the quantity of objects corresponding to a process applied to each of the intermediate images.

11 Claims, 8 Drawing Sheets

```
START
  ↓
OBTAIN IMAGE — S101
  ↓
INPUT IMAGE TO LEARNING EQUIPMENT — S102
  ↓
OBTAIN INTERMEDIATE IMAGES FROM INTERMEDIATE LAYER — S103
  ↓
GENERATE COMBINATION IMAGE BY COMBINING OBTAINED INTERMEDIATE IMAGES TOGETHER — S104
  ↓
END
```

FIG.8

GENERATING APPARATUS, GENERATING METHOD, AND NON-TRANSITORY COMPUTER READABLE STORAGE MEDIUM

CROSS-REFERENCE TO RELATED APPLICATION(S)

The present application claims priority to and incorporates by reference the entire contents of Japanese Patent Application No. 2016-106559 filed in Japan on May 27, 2016.

BACKGROUND OF THE INVENTION

1. Field of the Invention

The present invention relates to a generating apparatus, a generating method, and a non-transitory computer readable storage medium.

2. Description of the Related Art

Conventionally, techniques have been offered in relation to extracting features from an image by using a neural network. For example, a technique is offered by which a significance map of an image is generated by using a convolutional neural network. As another example, a technique is offered by which one or more objects included in an image are discriminated by using a neural network.

However, according to the conventional techniques described above, information used for appropriately recognizing the image is not necessarily generated. For example, merely discriminating the objects contained in the image does not necessarily mean that information used for appropriately recognizing the image is generated from information available in the neural network.

SUMMARY OF THE INVENTION

It is an object of the present invention to at least partially solve the problems in the conventional technology.

According to one aspect of an embodiment, a generating apparatus includes an obtaining unit that obtains intermediate images in an intermediate layer of a neural network that recognizes a quantity of objects contained in an image, and a generating unit that generates a combination image by combining together the intermediate images obtained by the obtaining unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments to carry out a generating apparatus, a generating method, and a generating computer program of the present application (hereinafter, "the embodiments") will be explained in detail below, with reference to the accompanying drawings. The generating apparatus, the generating method, and the generating computer program of the present application are not limited by the embodiments. Further, in the embodiments described below, the same elements will be referred to by using the same reference characters, and duplicate explanations will be omitted.

Embodiments

1. A Generating Process

Figure 1:
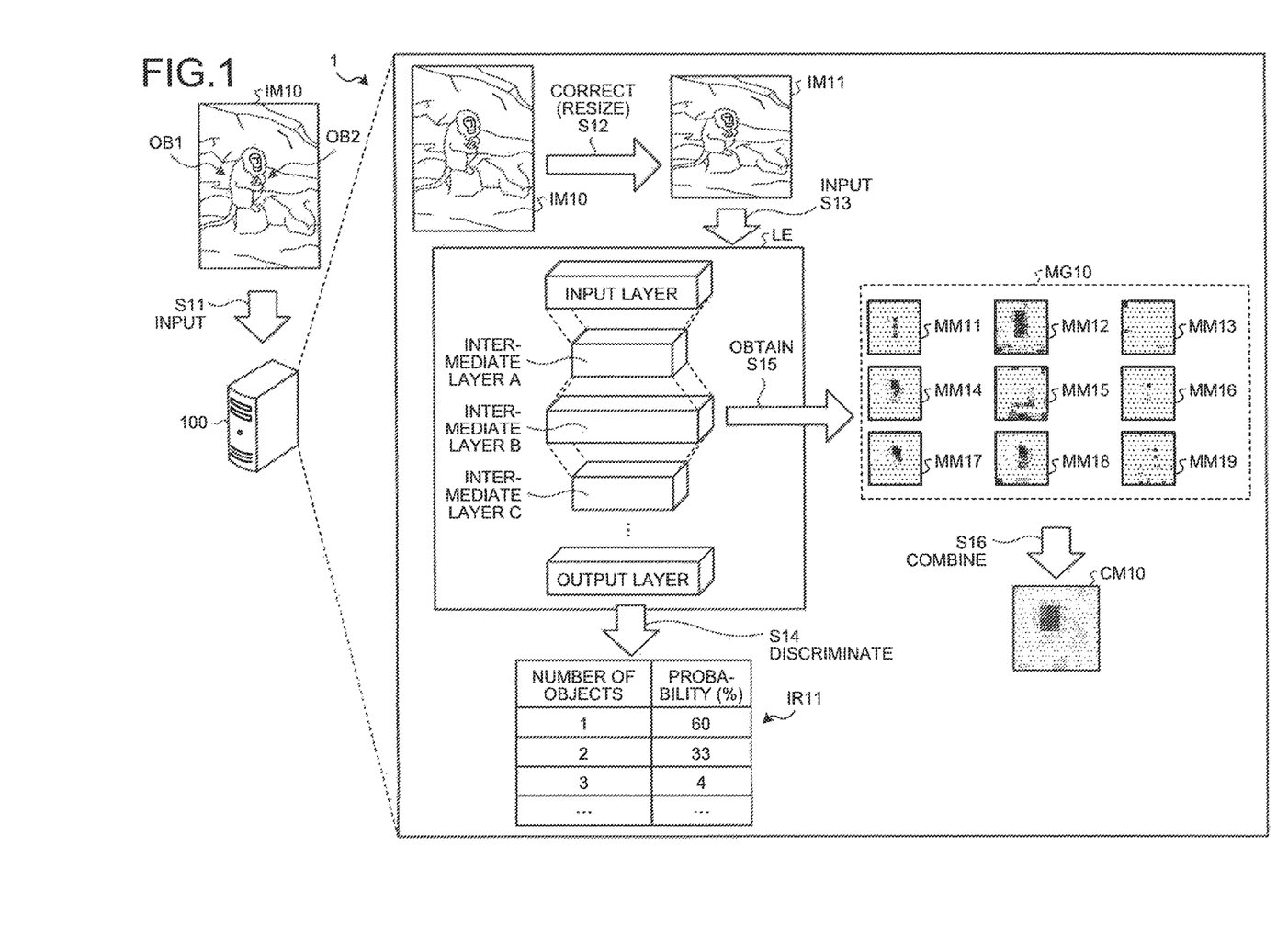
FIG. 1 is a diagram illustrating an example of a generating process according to an embodiment.
Figure 2:
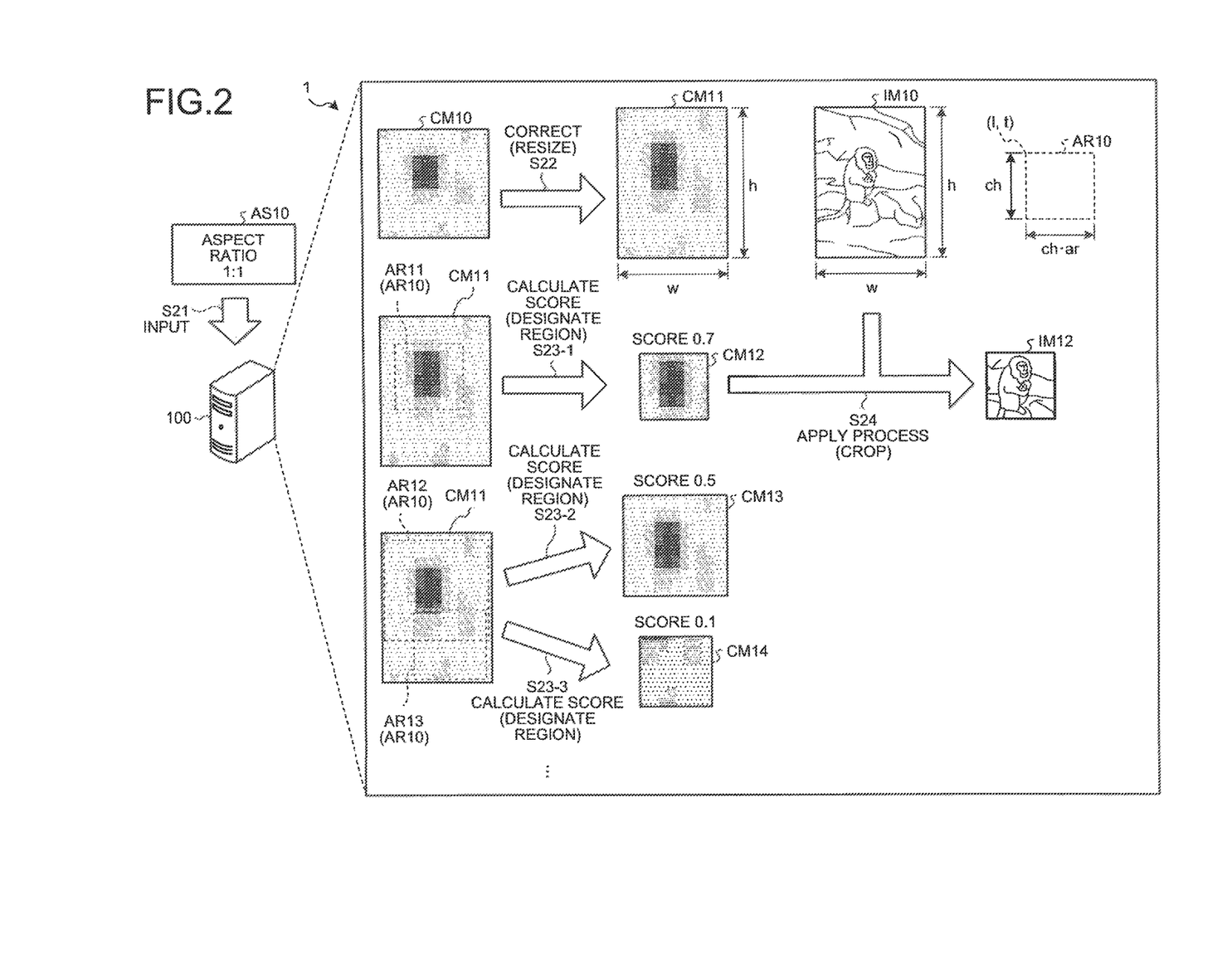
FIG. 2 is another diagram illustrating the example of the generating process according to the embodiment.

An example of a generating process according to an embodiment will be explained, with reference to FIGS. 1 and 2. FIGS. 1 and 2 are diagrams illustrating an example of the generating process according to the embodiment. For example, a generating system 1 illustrated in FIGS. 1 and 2 includes a generating apparatus 100 and a terminal apparatus (not illustrated) of a client who requests that a process be applied to an image. The generating apparatus 100 illustrated in FIG. 1 is configured to apply the process to the image by using intermediate images obtained from a piece of learner that recognizes the number of objects (the quantity of objects) contained in the image. More specifically, the generating apparatus 100 calculates a score for each of predetermined regions in the image, by using the intermediate images obtained from the learner and further crops the image on the basis of the scores. For example, the learner that recognizes the number of objects contained in the image may be a piece of learner as described in Non Patent Literature (Jianming Zhang, Shugao Ma, Mehrnoosh Sameki, Stan Sclaroff, Margrit Betke, Zhe Lin, Xiaohui Shen, Brian Price, Radomir Mech "Salient Object Subitizing", The IEEE Conference on Computer Vision and Pattern Recognition (CVPR), 2015, pp. 4045-4054) that is generated by using, as appropriate, any of various conventional techniques related to quantity detections or the like performed in convolutional neural networks (CNNs). In the present example, "cropping" denotes a process of cutting out a predetermined region from an image. Further, the image generated by the generating apparatus 100 by performing the cropping process is distributed as, for example, an image of a predetermined piece of content, and the details thereof will be explained later.

First, a combination image generating process performed by the generating apparatus 100 will be explained, with reference to FIG. 1. As illustrated in FIG. 1, the generating apparatus 100 receives an input of an image IM10 (step S11). For example, the generating apparatus 100 obtains the image IM10 rendering, as objects, a parent monkey (the object OB1 in the image IM10) and a baby monkey (the object OB2 in the image IM10) held by the parent monkey. Having obtained the image IM10, the generating apparatus 100 inputs the image IM10 to a predetermined piece of learner. In this situation, the objects are not limited to the monkeys and may be any of various types of objects such as other animals including human beings, plants, cars, and the like. Further, the objects in the present example may include different kinds of objects as long as the objects are recognizable. For example, the objects may include various kinds of phenomena such as a flame or an ocean wave.

Next, the learner used by the generating apparatus 100 will be explained. The learner used by the generating apparatus 100 is a piece of learner in which a plurality of nodes each configured to output a computation result of input data are connected in multiple layers and which has learned abstracted features of images through a supervised learning process. For example, the learner may be a neural network in which layers having a plurality of nodes are connected on multiple levels and may be a Deep Neural Network (DNN) realized with the technology of what is called deep learning. Further, the "features of images" is a concept that includes, not only the specific features appearing in the images such as whether the images contain text or not, colors, and structures of the images, but also abstracted features (so as to have a meta attribute) of the images such as what are the objects that are imaged, what types of users would like the images, the atmosphere of the images, and the like.

For example, the learner is generated by implementing the learning method described below, while using the technology of deep learning: For example, in the learner, connection coefficients among the nodes are initialized, and images having various features are input to the learner. After that, the learner is generated by a process implementing a back propagation method (a method by which differences are propagated back) or the like by which parameters (the connection coefficients) are corrected so as to reduce the differences between an output of the learner and the input images. For example, the learner is generated by performing the process implementing the back propagation method or the like so as to minimize a predetermined loss function. By repeatedly performing the process described above, the learner becomes able to yield an output with which it is possible to better reproduce the input images, i.e., to output features of the input images.

The learning method used by the learner is not limited to the method described above. An arbitrary publicly-known technique may be used. Further, as for the information used by the learner in the learning process, various types of data sets of images may be used, such as images and the number of objects contained in each of the images. As for the information used by the learner in the learning process may be: a set made up of images each containing one object and information indicating that the number of objects is one; a set made up of images each containing a plurality of (e.g., two) objects and information indicating that the number of objects is plural (e.g., two); and a set made up of images each containing no object and information indicating that no object is contained (the number of objects is zero). Further, arbitrary methods are applicable as to the method used for inputting the images to the learner, the format of the data output by the learner, and specifics of the features that are explicitly caused to be learned by the learner. In other words, the generating apparatus 100 may use any arbitrary learner as long as the learner is able to calculate a feature value indicating an abstracted feature from images.

FIG. 1 illustrates an example using a piece of learner (LE) that is based on a so-called convolutional neural network and that repeatedly performs a convolution process and a pooling process on a local region of an input image. In the following sections, the convolutional neural network may be referred to as a "CNN". For example, the learner LE based on the CNN has a characteristic where the output is invariable even when text or an imaged object contained in the image has a positional change, in addition to the function of extracting and outputting features from the image. Accordingly, the learner LE is capable of calculating the abstracted features of the image with an excellent level of precision.

For instance, in the example in FIG. 1, the generating apparatus 100 uses the learner LE configured with a discriminator (a model) that discriminates the number of objects contained in an image. In other words, in the example in FIG. 1, the generating apparatus 100 uses the learner LE that has already been generated through a predetermined learning process as the one described above. Although FIG. 1 illustrates the example in which the generating apparatus 100 uses the learner LE configured to discriminate the number of objects contained in the image, the generating apparatus 100 may use any type of learner. For example, the generating apparatus 100 may use a piece of learner configured to discriminate whether or not one object is contained in an image; a piece of learner configured to discriminate whether or not two objects are contained in an image; or a piece of learner configured to discriminate whether or not no image is contained in an image. Further, apart from the loss function used for generating the learner LE, another mathematical function is introduced and explained below as a function L that indicates a certainty factor of a recognition result obtained when the learner LE performs the recognition process. The function L may be any type of mathematical function as long as the function L expresses the certainty factor of the recognition result. For example, the function L may be an entropy value calculated from a probability of discrimination. Further, for example, the function L may be any type of mathematical function as long as the function L expresses a precision level of the recognition of the learner LE. Further, details of the function L used in FIG. 1 will be explained later.

In FIG. 1, when having obtained the image IM10, the generating apparatus 100 corrects the image IM10 so as to input the image IM10 to the learner LE (step S12). For example, the generating apparatus 100 generates an image IM11 by correcting the aspect ratio of the image IM10 so as to be 1:1. In this manner, in FIG. 1, the generating apparatus 100 generates the image IM11 having an aspect ratio of 1:1, by resizing the image IM10. To perform the process of correcting the image such as the one to change the aspect ratio as described above, it is acceptable to use any of various types of conventional techniques such as one for smoothing the image, as appropriate.

When it is possible to input the image IM10 to the learner LE without applying any modification thereto, the generating apparatus 100 may input the image IM10 to the learner LE. In other words, the image IM10 and the image IM11 may be the same image as each other. For example, when it is possible to input an image of any aspect ratio to the learner LE, the image IM10 and the image IM11 may be the same image as each other. For example, the process at step S12 may be performed by the learner LE.

In FIG. 1, the generating apparatus 100 inputs the image IM11 to the learner LE (step S13). Alternatively, the generating apparatus 100 may input the image IM10 to the learner LE. For example, the learner LE discriminates the number of objects contained in the image IM11 (step S14). In FIG. 1, because the image IM10 contains, as objects, the parent monkey and the baby monkey held by the parent monkey, the learner LE generates discrimination information IR11 indicating that there is a high possibility that the number of objects contained in the image IM10 may be one or two. The process at step S14 is a process for explaining the operation of the learner LE and does not necessarily have to be performed. The information output by the learner LE may be any information as long as the information is related to the discrimination of the number of objects. The output information may be information from which it is possible to generate the discrimination information IR11. For example, when the learner LE is configured to discriminate whether or not the number of objects contained in the image is one, the learner LE may generate discrimination information indicating that one object is contained in the image IM10.

In this situation, the learner LE is a piece of learner generated by the CNN and includes a plurality of intermediate layers A to C and so on. Accordingly, when having input the image IM10 to the learner LE, the generating apparatus 100 obtains information (hereinafter, "intermediate images") in a predetermined intermediate layer. In FIG. 1, when having input the image IM10 to the learner LE, the generating apparatus 100 obtains intermediate images in the intermediate layer B (step S15). More specifically, the generating apparatus 100 obtains a group of intermediate images MG10 including intermediate images MM11 to MM19. In FIG. 1, regions exhibiting features in the intermediate images MM11 to MM19 are indicated in darker colors. For example, the intermediate image MM12 indicates that a region exhibiting features is contained in a center part thereof. Further, for example, the intermediate image MM16 indicates that almost no region exhibiting features is contained.

Further, the generating apparatus 100 combines together the intermediate images MM11 to MM19 included in the group of intermediate images MG10 obtained at step S15 (step S16). In FIG. 1, the generating apparatus 100 generates a combination image CM10 by combining together the intermediate images MM11 to MM19. In FIG. 1, the generating apparatus 100 generates the combination image CM10 by combining together the intermediate images MM11 to MM19 to which a weight has been applied on the basis of a change in the recognition of the number of objects corresponding to a process applied to each of the intermediate images MM11 to MM19.

Next, details of the function L will be explained. In FIG. 1, for example, the function L is calculated by using Expression (1) presented below.

$$L(x_{ij}^f) = -\sum_c P_c(x_{ij}^f) \log P_c(x_{ij}^f) \tag{1}$$

In Expression (1) above and Expressions (2) to (5) below, the letter "x" denotes an image, while the letter "f" indicates which one of the intermediate images, and the letters "i" and "j" serve as a pixel index. In the following explanation, "i,j" will be omitted from the notation. In other words, in FIG. 1, "$x^f$" corresponds to one of the intermediate images MM11 to MM19.

Further, in Expression (1) above, "$L(x^f)$" on the left-hand side denotes the value of the function L of one of the intermediate images MM11 to MM19 corresponding to "$x^f$". Further, the number of objects to be discriminated (classified) is input to the letter "c". For example, when the learner LE is configured to discriminate which value selected from among 0, 1, 2, 3, and 4 or larger is equal to the number of objects, the value of "c" varies from 1 to 4. Further, in Expression (1) above, the symbol "$p_c$" on the right-hand side denotes the probability of the number of objects being equal to c. For example, "$p_1$" corresponds to the probability of the number of objects being 1. Further, in Expression (1) above, the base of "log" on the right-hand side may be a value selected from among various values (e.g., 2).

"$L(x^f)$" denotes the sum obtained by assigning each of the values from 1 to 4 to c. In that situation, "$L(x^f)$" calculated by using Expression (1) above corresponds to an average information amount (an entropy value), for example. The range of possible values of the function L can be expressed, for example, as indicated in Expression (2) below.

$$0 \leq L(x_{ij}^f) \leq \log N_c \tag{2}$$

For example, when the learner LE is configured to discriminate which value selected from among 0, 1, 2, 3, and 4 or large is equal to the number of objects, the symbol "$N_c$" in Expression (2) above is equal to 5. For example, when the base of "log" in Expression (2) above is "2", the maximum possible value "$\log N_c$" of "$L(x^f)$" is "2.32 . . . ".

As explained above, the generating apparatus 100 generates the combination image CM10 by combining together the intermediate images MM11 to MM19 to which the weight has been applied on the basis of the change in the recognition of the number of objects corresponding to the process applied to each of the intermediate images MM11 to MM19. In the present example, the processes applied to the intermediate images may be realized by any of various types of means in accordance with the purpose, such as increasing the brightness of each of the intermediate images by a predetermined value. Further, the processes applied to the intermediate images are not limited to the operation of actually changing the brightness levels or the like of the intermediate images, but may be a conceptual operation performed for the purpose of calculating a predetermined value by using Expression (3) presented below, or the like. Further, it is conjectured that the intermediate images to which the processes are applied that cause a change in the recognition ratio for the number of objects are intermediate images having an influence on the recognition of the number of objects contained in the input image.

In this situation, the generating apparatus 100 judges whether or not each of the intermediate images has an influence on the recognition ratio for the number of objects due to the process applied thereto, by judging a change in the function L. It is possible to derive the change in the function L, by using Expression (3) presented below, for example:

$$L(x+\varepsilon x) - L(x) \sim \sum_{i,j,f} \varepsilon \frac{\partial L}{\partial x_{ij}^f} x_{ij}^f = \varepsilon \sum_f u_f \tag{3}$$

In Expression (3) above, "$L(x+\varepsilon x)$" on the left-hand side is a total of values of the function L observed when the process is applied to each of the intermediate images MM11 to MM19. Further, in Expression (3) above, "$L(x)$" on the right-hand side is a total of values of the function L observed when the process is not applied to any of the intermediate images MM11 to MM19. Thus, the left-hand side of Expression (3) indicates a change in the function L, for example. In this example, "ε" is a value extremely smaller than 1, whereas "εx$_{ij}^f$" is a change value that is very small. Further, in Expression (3) above, the term with "Σ" on the left-hand side indicates a sum of the amounts of change in the function L observed when the process is applied to each of the intermediate images MM11 to MM19. Thus, it is possible to express the variable "$u_f$" on the right-hand side of Expression (3) above, as indicated below.

$$u_f = \sum_{i,j} \frac{\partial L}{\partial x_{ij}^f} x_{ij}^f \quad (4)$$

As explained above, "$u_f$" indicates the amount of change in the function L observed when the process is applied to a corresponding one of the intermediate images MM11 to MM19. Further, it is possible to calculate the combination image CM10 generated by the generating apparatus 100 by using Expression (5) presented below with the use of "$u_f$".

$$s_{ij} = \sum_{f} F(u_f) x_{ij}^f \quad (5)$$

In Expression (5) above, the letter "F" on the right-hand side denotes a predetermined mathematical function. For example, "F" may be such a mathematical function where the larger the value of "$u_f$" is, the larger value is returned by "F". "F" may be any mathematical function as long as the following is true: The higher the degree of contribution to an improvement of the recognition ratio for the number of objects is, the larger is the value of F.

Further, in Expression (5) above, the letter "s" denotes the combination image, whereas "i" and "j" serve as a pixel index. For example, in FIG. 1, "$s_{ij}$" denotes a sum of values based on pixels in the intermediate images MM11 to MM19 corresponding to each of the pixels in the combination image CM10. For example, "$s_{11}$" denotes a sum of the values based on the pixels in the intermediate images MM11 to MM19 corresponding to the pixel "1,1" in the combination image CM10.

By using Expression (5) above, the generating apparatus 100 generates the combination image CM10 by combining together the intermediate images MM11 to MM19 to which the weight has been applied on the basis of the change in the recognition of the number of objects corresponding to the process applied to each of the intermediate images MM11 to MM19. In the example illustrated in FIG. 1, the size of the combination image CM10 is equal to the size of the image IM11. The combination image CM10 indicates feature values of the pixels in the image IM11. In this situation, each of the feature values is, for example, a numerical value indicating the amount of feature. More specifically, the position of each of the points (the pixels) constituting the combination image CM10 corresponds to the overlapping position in the image IM11, when the combination image CM10 is superimposed on the image IM11. The combination image CM10 thus indicates the feature values of the corresponding pixels in the image IM11. In the combination image CM10 illustrated in FIG. 1, the regions exhibiting the features are indicated in darker colors. In other words, the combination image CM10 uses such a display mode where the larger a feature value is, the darker is the color. For example, in the combination image CM10 illustrated in FIG. 1, the regions where the parent monkey and the baby monkey are positioned in the image IM11 are indicated in darker colors.

Next, a processed image generating process that is realized by applying a process to the images and is performed by the generating apparatus 100 will be explained, with reference to FIG. 2.

As illustrated in FIG. 2, the generating apparatus 100 receives an input of information related to an aspect ratio (step S21). For example, the generating apparatus 100 receives an input of an aspect ratio AS10 from a user who applies a process to the image IM10. In FIG. 2, the generating apparatus 100 receives information indicating an aspect ratio "1:1". In this situation, as long as it is possible to identify the aspect ratio, the generating apparatus 100 may receive any type of information such as the sizes in the height direction and the width direction. On the basis of the aspect ratio obtained at step S21, the generating apparatus 100 generates a processed image by cropping the image IM10. Details of the generating process will be explained later.

As illustrated in FIG. 2, the generating apparatus 100 corrects the combination image CM10 so as to have the same size as that of the image IM10 (step S22). For example, the generating apparatus 100 generates a corrected image CM11, by correcting the size of the combination image CM10 in the height direction to be equal to a height h and correcting the size of the combination image CM10 in the width direction to be equal to a width w. In this situation, the height h and the width w may each be expressed with the number of pixels. In this manner, in FIG. 2, the generating apparatus 100 generates the corrected image CM11 corresponding to the image IM10, by resizing the combination image CM10. To perform the abovementioned process of generating the corrected image CM11, it is acceptable to use any of various types of conventional techniques such as one for smoothing the image, as appropriate.

The generating apparatus 100 crops the image IM10 so as to satisfy the aspect ratio 1:1 obtained at step S21. More specifically, the generating apparatus 100 takes out the processed image from the image IM10, on the basis of a score calculated from a predetermined region of the corrected image CM11 and a feature value included in the predetermined region. In FIG. 2, the generating apparatus 100 calculates the score by using feature values of the pixels in the region included in a cut-out frame AR10 within the corrected image CM11. In this situation, the cut-out frame AR10 is a region that is enlargeable and reducible while satisfying the aspect ratio 1:1.

In the cut-out frame AR10 in FIG. 2, the coordinates of the upper left corner is "(l,t)", while the height is expressed as "ch", and the width is expressed as "ch·ar", which is a value obtained by multiplying "ch" by "ar". In this situation, "ar" is a value based on the aspect ratio. In FIG. 2, because the aspect ratio of the cut-out frame AR10 is 1:1, "ar" is "1". When the aspect ratio is 2:1, "ar" is "2 (=2/1)".

In the example in FIG. 2, the size of the corrected image CM11 is equal to the size of the image IM10. The corrected image CM11 exhibits the feature values of the pixels in the image IM10. More specifically, the position of each of the points (the pixels) constituting the corrected image CM11 corresponds to the overlapping position in the image IM10, when the corrected image CM11 is superimposed on the image IM10. The corrected image CM11 thus indicates the feature values of the corresponding pixels in the image IM10. In the corrected image CM11 illustrated in FIG. 2, the regions exhibiting features are indicated in darker colors. In other words, the corrected image CM11 uses such a display mode where the larger a feature value is, the darker is the color. For example, in the corrected image CM11 illustrated in FIG. 2, the regions where the parent monkey and the baby monkey are positioned in the image IM10 are indicated in darker colors.

For example, the generating apparatus 100 calculates scores by varying the region included in the cut-out frame AR10, by enlarging/reducing the size of the cut-out frame AR10 and moving the position thereof around, while maintaining the aspect ratio 1:1 of the cut-out frame AR10. After that, the generating apparatus 100 crops a region having the highest score among various regions included in the cut-out frame AR10 that are obtained by varying the cut-out frame AR10. For example, the generating apparatus 100 may crop the region having the highest score, by calculating a score for each of all the patterns exhibited while the cut-out frame AR10 satisfies the aspect ratio 1:1.

In this situation, the generating apparatus 100 calculates a score of a region of interest (which may hereinafter be referred to as an ROI) included in the cut-out frame AR10, by using Expression (6) presented below.

$$\text{score}(R_c) = E_s(R_c) - \phi E_A(R_c) \tag{6}$$

In Expression (6) above, "score($R_c$)" on the left-hand side denotes the calculated score. "$R_c$" denotes a region of interest, which can be expressed as indicated in Expression (7) below.

$$\text{ROI}: R_c = (l, t, ch) \tag{7}$$

In Expression (7) above, "l" on the right-hand side corresponds to the x coordinate of the upper left corner of the region of interest, whereas "t" corresponds to the y coordinate of the upper left corner of the region of interest. Further, "ch" corresponds to the height of the region of interest. When the aspect ratio is given, the generating apparatus 100 is able to identify the size and the position of the region of interest, i.e., the size and the position of the cut-out frame AR10, when the values of "l", "t", and "ch" above are identified.

Further, in Expression (6) above, the first term "$E_s(R_c)$" on the right-hand side denotes an energy value, for example, and may be calculated by using Expression (8) below.

$$E_s(R_c) = \frac{S(R_c)}{S_{total}} \tag{8}$$

In Expression (8) above, the denominator "$S_{total}$" is a value calculated from the feature values of the entire corrected image. For example, "$S_{total}$" may be a total of the feature values of the entire corrected image. In FIG. 2, the generating apparatus 100 calculates "$S_{total}$" from the feature values of the entirety of the corrected image CM11.

Further, in Expression (8) above, the numerator "$S(R_c)$" is a value calculated from the feature values of the region of interest included in the cut-out frame AR10. For example, "$S(R_c)$" may be a total of the feature values of the region of interest. In FIG. 2, the generating apparatus 100 calculates "$S(R_c)$" from the feature values of each of the regions of interest CM12, CM13, CM14, and so on included in the cut-out frame AR10. For example, the first term "$E_s(R_c)$" on the right-hand side denotes an energy value. The larger the proportion of the darker part (having a larger feature value) in the region included in the cut-out frame AR10, the larger is the value of $E_s(R_c)$.

Further, in Expression (6) above, the second term "$\phi E_A(R_c)$" on the right-hand side denotes a penalty term, for example. It is possible to calculate "$E_A(R_c)$" by using Expression (9) presented below.

$$E_A(R_c) = \frac{ch(ch \cdot ar)}{h \cdot w} \tag{9}$$

In Expression (9) above, the denominator "h·w" is a value calculated by multiplying the height h of the entire corrected image by the width w thereof. For example, "h·w" denotes the area (the number of pixels) of the entire corrected image. Further, in Expression (9) above, the numerator "ch(ch·ar)" is a value calculated by multiplying the height "ch" of the cut-out frame AR10 by the width "ch·ar" thereof. For example, "ch(ch·ar)" denotes the area (the number of pixels) of the region of interest included in the cut-out frame AR10. For example, the larger the cut-out frame AR10 is (i.e., the larger the region of interest is), the larger is the value of "$E_A(R_c)$".

Further, "$\phi$" in "$\phi E_A(R_c)$" is a predetermined parameter. Accordingly, in Expression (6) above, the larger the energy value "$E_s(R_c)$" is, and the smaller the penalty term "$\phi E_A(R_c)$" is, the higher is the score. In this situation, the generating apparatus 100 may adjust the calculated score by changing the penalty term (e.g., the parameter "$\phi$"), as appropriate.

In FIG. 2, the generating apparatus 100 determines a region to be cropped from the image IM10, on the basis of the scores calculated by using Expression (6) above.

For example, from the corrected image CM11, the generating apparatus 100 designates a region included in a cut-out frame AR11 obtained by changing the size and the position of the cut-out frame AR10 and further calculates a score based on feature values included in the designated region (step S23-1). For example, the generating apparatus 100 calculates the score of a region of interest CM12 included in the cut-out frame AR11 as 0.7.

Further, for example, from the corrected image CM11, the generating apparatus 100 designates a region included in a cut-out frame AR12 obtained by changing the size and the position of the cut-out frame AR10 and further calculates a score based on feature values included in the designated region (step S23-2). For example, the generating apparatus 100 calculates the score of a region of interest CM13 included in the cut-out frame AR12 as 0.5.

Further, for example, from the corrected image CM11, the generating apparatus 100 designates a region included in a cut-out frame AR13 obtained by changing the size and the position of the cut-out frame AR10 and further calculates a score based on feature values included in the designated region (step S23-3). For example, the generating apparatus 100 calculates the score of a region of interest CM14 included in the cut-out frame AR13 as 0.1. In the following sections, steps S23-1 through 23-3 describing the process of calculating the scores by changing the size and the position of the cut-out frame AR10 will collectively be referred to as step S23.

For example, by repeatedly performing the process at step S23 or the like while changing the size and the position of the cut-out frame AR10, the generating apparatus 100 calculates a score for each of the regions of interest corresponding to a large number of patterns. In the example in FIG. 2, to keep the explanation simple, a situation will be explained in which the score "0.7" of the region of interest CM12 included in the cut-out frame AR11 is the highest.

On the basis of the cut-out frame AR11, the generating apparatus 100 crops the image IM10 (step S24). More specifically, the generating apparatus 100 generates a processed image IM12 from the image IM10, by cropping a region in the image IM10 included in a cut-out frame corresponding to the cut-out frame AR11. For example, the generating apparatus 100 generates the processed image IM12 from the image IM10, by cropping such a region of the image IM10 that overlaps with the region of interest CM12 in the corrected image CM11 when the image IM10 and the corrected image CM11 are superimposed on each other. In this manner, by applying the process to the image IM10, the generating apparatus 100 generates the processed image IM12 from the image IM10.

As explained above, the generating apparatus 100 generates the information used for appropriately recognizing the image from the information available in the neural network (the CNN in FIG. 1). In FIG. 1, the generating apparatus 100 obtains the intermediate images from the group of intermediate images MG10 in the intermediate layer of the CNN. Further, by combining together the obtained intermediate images, the generating apparatus 100 generates the combination image. Subsequently, the generating apparatus 100 calculates the scores of the regions of interest by using the corrected image obtained by correcting the combination image so as to have the size of the image subject to the cropping. After that, the generating apparatus 100 determines the region to be cropped from the image on the basis of the score calculated for each of the regions of interest. As a result, the generating apparatus 100 is able to crop the appropriate region from the image.

2. A Configuration of the Generating Apparatus

Figure 3:
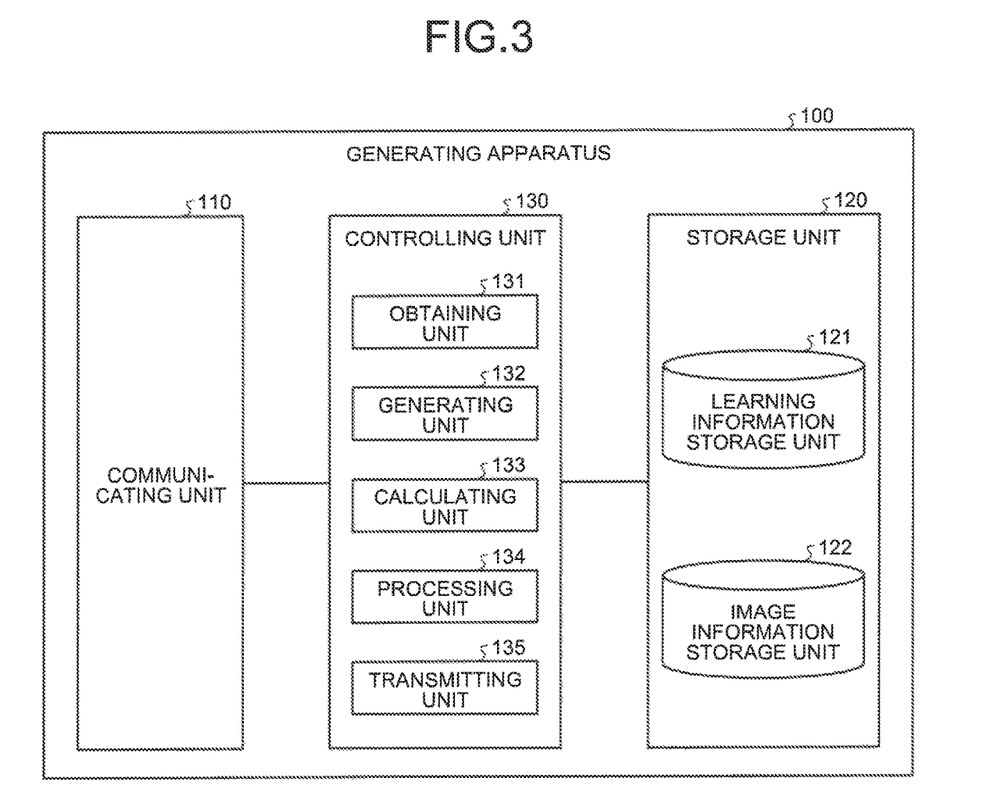
FIG. 3 is a diagram illustrating an exemplary configuration of a generating apparatus according to the embodiment.

Next, a configuration of the generating apparatus 100 according to the embodiment will be explained, with reference to FIG. 3. FIG. 3 is a diagram illustrating an exemplary configuration of the generating apparatus 100 according to the embodiment. As illustrated in FIG. 3, the generating apparatus 100 includes a communicating unit 110, a storage unit 120, and a controlling unit 130. Further, the generating apparatus 100 may also include an input unit (e.g., a keyboard and/or a mouse) configured to receive various types of operations from an administrator or the like of the generating apparatus 100 and/or a display unit (e.g., a liquid crystal display device) configured to display various types of information.

The Communicating Unit 110

The communicating unit 110 is realized with a Network Interface Card (NIC), for example. Further, the communicating unit 110 is connected to a network in a wired or wireless manner and is configured to transmit and receive information to and from a terminal apparatus included in the generating system 1, for example.

The Storage Unit 120

For example, the storage unit 120 is realized by using a semiconductor memory element such as a Random Access Memory (RAM), a Flash Memory, or the like, or a storage device such as a hard disk, an optical disk, or the like. As illustrated in FIG. 3, the storage unit 120 according to the present embodiment includes a learning information storage unit 121 and an image information storage unit 122.

The Learning Information Storage Unit 121

Figure 4:
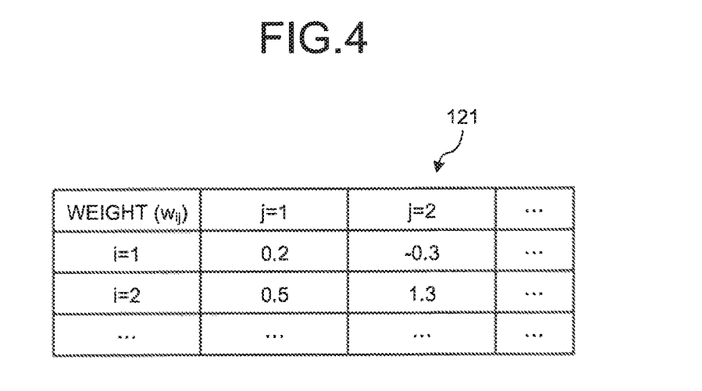
FIG. 4 is a table illustrating an example of a learning information storage unit according to the embodiment.

The learning information storage unit 121 according to the embodiment stores therein various types of information related to learning. For example, in FIG. 4, the learning information storage unit 121 stores therein learning information (a model) related to the learner LE generated by a predetermined learning process. FIG. 4 illustrates an example of the learning information storage unit 121 according to the embodiment. The learning information storage unit 121 illustrated in FIG. 4 stores therein a "weight ($w_{ij}$)".

For instance, the example illustrated in FIG. 4 indicates that a "weight ($w_{11}$)" is "0.2", whereas a "weight ($w_{12}$)" is "−0.3". Further, the example illustrated in FIG. 4 indicates that a "weight ($w_{21}$)" is "0.5", whereas a "weight ($w_{22}$)" is "1.3".

In this situation, the "weight ($w_{ij}$)" may be, for example, a synaptic connection coefficient from a neuron $y_i$ to a neuron $x_j$ in the learner LE. Further, the learning information storage unit 121 may store therein various types of information other than those described above, in accordance with the purpose.

The Image Information Storage Unit 122

Figure 5:
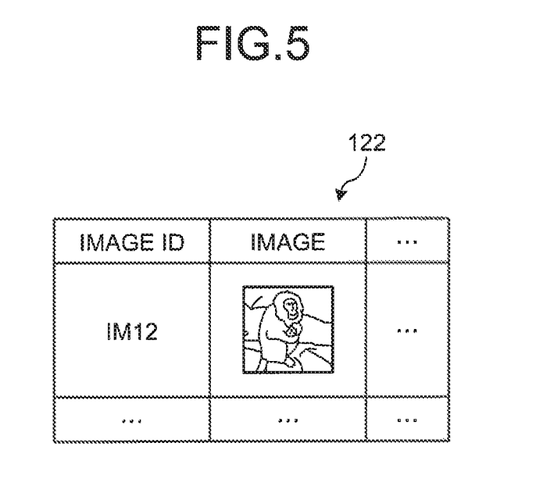
FIG. 5 is a table illustrating an example of an image information storage unit according to the embodiment.

The image information storage unit 122 according to the embodiment stores therein various types of information related to images. FIG. 5 illustrates an example of the image information storage unit 122 according to the embodiment. The image information storage unit 122 illustrated in FIG. 5 has items called "image ID", "image", and the like.

Listed under the "image ID" is identification information used for identifying each image. Listed under the "image" is image information. More specifically, listed under the "image" are one or more images each generated by a cropping process. Although FIG. 5 illustrates an image identified by an image ID for the sake of convenience in the explanation, it is also acceptable to store, as the image, a file path name or the like indicating the storing location of the image.

The image information storage unit 122 may store therein various types of information other than those described above, in accordance with the purpose. For example, the image information storage unit 122 may store therein information about a date/time at which the image was generated. Further, for example, the image information storage unit 122 may store therein information about one or more objects contained in the image. In FIG. 5, the image information storage unit 122 may store therein information indicating that the parent monkey and the baby monkey are contained in the image identified by the image ID "IM12". Further, for example, the image information storage unit 122 may store therein an original image from which the image was obtained.

The Controlling Unit 130

Returning to the description of FIG. 3, the controlling unit 130 is a controller and is realized as a result of causing various types of computer programs (corresponding to an example of the generating computer program) that are stored in a storage device provided within the generating apparatus 100 to be executed by a Central Processing Unit (CPU), a Micro Processing Unit (MPU), or the like, while using a RAM as a working area. Alternatively, the controlling unit 130 is a controller and may be realized, for example, by using an integrated circuit such as an Application Specific Integrated Circuit (ASIC), a Field Programmable Gate Array (FPGA), or the like.

As illustrated in FIG. 3, the controlling unit 130 includes an obtaining unit 131, a generating unit 132, a calculating unit 133, a processing unit 134, and a transmitting unit 135 and is configured to realize or to execute functions and operations of the information processing processes described below. The internal structure of the controlling unit 130 is not limited to the configuration illustrated in FIG.

3. As long as the information processing processes described below can be realized, the controlling unit 130 may have another configuration.

The Obtaining Unit 131

The obtaining unit 131 is configured to obtain an image. For example, the obtaining unit 131 obtains an image from an external information processing apparatus. In FIG. 1, the obtaining unit 131 obtains the image IM10 from an external information processing apparatus. When the image information storage unit 122 stores therein an original image (e.g., the image IM10), the obtaining unit 131 may obtain the image (e.g., the image IM10) from the image information storage unit 122. Further, the obtaining unit 131 obtains the group of intermediate images MG10 including the intermediate images MM11 to MM19.

Further, for example, the obtaining unit 131 obtains the intermediate images in the intermediate layer of the neural network that performs the convolution process and the pooling process. For example, in the example in FIG. 1, the obtaining unit 131 obtains the group of intermediate images MG10 from the intermediate layer B of the learner LE. Alternatively, for example, the obtaining unit 131 may obtain the group of intermediate images MG10 from an external information processing apparatus.

The Generating Unit 132

The generating unit 132 is configured to generate the combination image by combining together the intermediate images obtained by the obtaining unit 131. For example, the generating unit 132 generates the combination image by combining together the intermediate images to which the weight has been applied in accordance with the change in the recognition ratio for the number of objects caused by the process applied thereto. For example, the generating unit 132 generates the combination image by combining together the intermediate images to which the weight has been applied in accordance with the change in the recognition ratio for the number of subjects caused by the process applied thereto, by using Expression (5) above. In FIG. 1, the generating unit 132 generates the combination image CM10 by combining together the intermediate images MM11 to MM19 included in the group of intermediate images MG10.

For example, the generating unit 132 may extract the intermediate images that contribute to an improvement of the recognition ratio for the number of objects, from the group of intermediate images in the intermediate layer of the neural network that recognizes the number of objects in an image. For example, the generating unit 132 extracts the intermediate images that contribute to an improvement of the recognition ratio for the number of objects, from the group of intermediate images in the intermediate layer of the neural network that recognizes the number of objects contained in an image. Alternatively, for example, the generating unit 132 extracts the intermediate images that contribute to an improvement of the recognition ratio for the number of objects, from the group of intermediate images in the intermediate layer of a neural network that performs the convolution process and the pooling process. For example, the generating unit 132 extracts the intermediate images that contribute to an improvement of the recognition ratio for the number of objects, from a group of intermediate images in the intermediate layer of a CNN. After that, the generating unit 132 may generate the combination image by using the extracted intermediate images.

Alternatively, for example, the generating unit 132 extracts the intermediate images on the basis of a change in the recognition ratio for the number of objects corresponding to the process applied to each of the intermediate images included in the group of intermediate images. For example, the generating unit 132 extracts the intermediate images that improve the recognition ratio for the number of objects due to the processes applied thereto. For example, the generating unit 132 extracts intermediate images of each of which the value on the left-hand side of Expression (4) above is a negative value due to the process applied thereto. For example, in FIG. 1, the generating unit 132 may extract the intermediate images MM12, MM14, MM17, and MM18 that contribute to the improvement of the recognition ratio for the number of objects, from the group of intermediate images MG10 in the intermediate layer of the CNN. After that, the generating unit 132 may generate the combination image, by using the extracted intermediate images MM12, MM14, MM17, and MM18.

For example, the generating unit 132 may extract intermediate images of each of which the value on the left-hand side of Expression (4) above is a positive value due to the process applied thereto. In that situation, each of the extracted intermediate images makes the function L larger. In other words, each of the extracted intermediate images is judged to be an intermediate image that has an influence on the recognition ratio for the number of objects. Accordingly, the generating unit 132 may generate the combination image by extracting the intermediate images of each of which the value on the left-hand side of Expression (4) above is a positive value due to the process applied thereto.

Further, the generating unit 132 may extract both intermediate images of each of which the value on the left-hand side of Expression (4) above is a negative value equal to or smaller than a predetermined negative threshold value due to the process applied thereto and intermediate images of each of which the value on the left-hand side of Expression (4) above is a positive value equal to or larger than a predetermined positive threshold value due to the process applied thereto. In other words, the generating unit 132 extracts the intermediate images of each of which the amount of change based on the value on the left-hand side of Expression (4) above caused by the process applied thereto is on the outside of the predetermined range. That is to say, the generating unit 132 extracts the intermediate images other than such intermediate images of each of which the amount of change based on the value on the left-hand side of Expression (4) above caused by the process applied thereto is within the predetermined range (i.e., having a small influence on the recognition ratio for the number of objects). The generating unit 132 thus extracts the intermediate images having a large influence on the recognition ratio for the number of objects. In that situation, by performing a predetermined normalization process, the generating unit 132 may generate the combination image from both the intermediate images each exhibiting a negative value equal to or smaller than the negative threshold value and the intermediate images each exhibiting a positive value equal to or larger than the predetermined positive threshold value.

The Calculating Unit 133

The calculating unit 133 is configured to calculate various types of information. For example, the calculating unit 133 calculates the score of each of the regions of interest by using Expression (6) above. In FIG. 2, the calculating unit 133 calculates the score by using the feature values of the pixels in the region included in the cut-out frame AR10 within the corrected image CM11. For example, the calculating unit 133 calculates the scores by varying the region included in the cut-out frame AR10 by enlarging/reducing the size of the cut-out frame AR10 and moving the position thereof around, while maintaining the aspect ratio 1:1 of the cut-out frame AR10.

In the example in FIG. 2, from within the corrected image CM11, the calculating unit 133 calculates the score of the region of interest CM12 included in the cut-out frame AR11 obtained by changing the size and the position of the cut-out frame AR10 as 0.7. Further, for example, from within the corrected image CM11, the calculating unit 133 calculates the score of the region of interest CM13 included in the cut-out frame AR12 obtained by changing the size and the position of the cut-out frame AR10 as 0.5. Further, for example, from within the corrected image CM11, the calculating unit 133 calculates the score of the region of interest CM14 included in the cut-out frame AR13 obtained by changing the size and the position of the cut-out frame AR10 as 0.1. For example, by repeatedly performing the process of varying the size and the position of the cut-out frame AR10, the calculating unit 133 calculates a score of each of the regions of interest corresponding to a large number of patterns.

The Processing Unit 134

The processing unit 134 is configured to apply a process to an image on the basis of the combination image. For example, the processing unit 134 applies the process to the image on the basis of the corrected image obtained by resizing the combination image. For example, on the basis of the combination image, the processing unit 134 takes out a part of the image as a processed image. For example, by using the corrected image obtained by changing the aspect ratio of the combination image on the basis of the aspect ratio of the image, the processing unit 134 takes out a part of the image as the processed image. For example, the processing unit 134 takes out (crops) the processed image from the image, on the basis of such a region of the corrected image that includes feature values equal to or larger than a predetermined threshold value. For example, the processing unit 134 takes out the processed image from the image on the basis of the scores calculated from the feature values in the corrected image. For example, the processing unit 134 takes out the processed image from the image, on the basis of the scores calculated from a predetermined region in the corrected image and feature values included in the predetermined region.

On the basis of a predetermined region formed by using a predetermined aspect ratio, the processing unit 134 takes out the processed image from the image. In the example in FIG. 2, the processing unit 134 crops the image IM10 so as to satisfy the aspect ratio 1:1. More specifically, the processing unit 134 takes out the processed image from the image IM10, on the basis of the score calculated from the predetermined region in the corrected image CM11 and the feature values included in the predetermined region. For example, the processing unit 134 crops the region having the highest score among various regions included in the cut-out frame AR10 that are obtained by varying the cut-out frame AR10.

For example, the processing unit 134 generates the processed image IM12 from the image IM10, by cropping the region in the image IM10 included in a cut-out frame corresponding to the cut-out frame AR11. For example, the processing unit 134 generates the processed image IM12 from the image IM10, by cropping such a region of the image IM10 that overlaps with the region of interest CM12 in the corrected image CM11 when the image IM10 and the corrected image CM11 are superimposed on each other.

The Transmitting Unit 135

The transmitting unit 135 is configured to transmit various types of information to an external information processing apparatus. For example, the transmitting unit 135 transmits any of the images generated by the processing unit 134 to an external information processing apparatus. In FIG. 1, the transmitting unit 135 transmits the processed image IM12. Further, when the generating apparatus 100 is configured to distribute content, the transmitting unit 135 may transmit a piece of content including the processed image IM12 to an external apparatus such as a terminal apparatus that requested the piece of content.

3. A Flow in a Combination Image Generating Process

Figure 6:
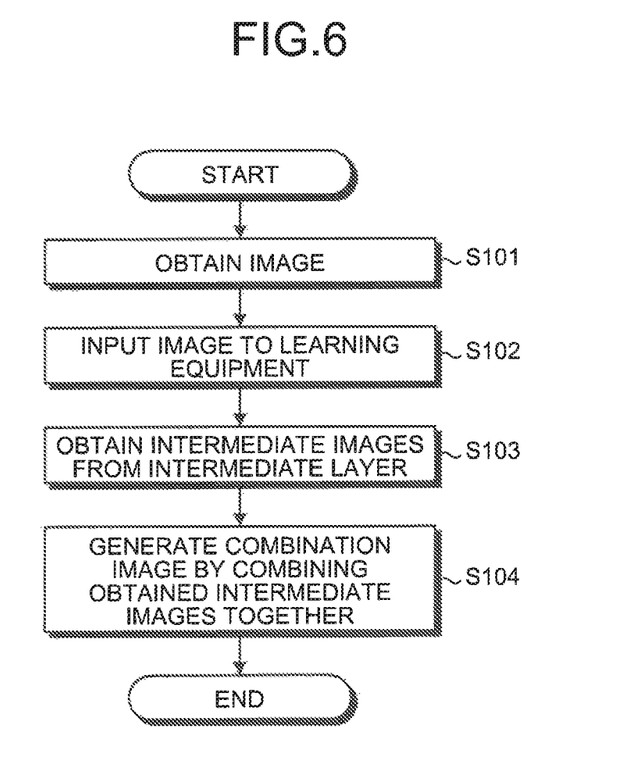
FIG. 6 is a flowchart illustrating an example of a combination image generating process according to the embodiment.

Next, a procedure in the combination image generating process performed by the generating apparatus 100 according to the embodiment will be explained, with reference to FIG. 6. FIG. 6 is a flowchart illustrating an example of the combination image generating process according to the embodiment.

As illustrated in FIG. 6, the generating apparatus 100 obtains an image (step S101). In FIG. 1, the generating apparatus 100 obtains the image IM10. After that, the generating apparatus 100 inputs the image obtained at step S101 to a piece of learner (step S102). In FIG. 1, the generating apparatus 100 inputs the obtained image IM10 to the learner LE.

Subsequently, the generating apparatus 100 obtains intermediate images from the intermediate layer related to the input image (step S103). In FIG. 1, the generating apparatus 100 obtains the intermediate images in the intermediate layer B, when the image IM10 is input to the learner LE. For example, the generating apparatus 100 obtains the intermediate image MM11 to MM19 in the intermediate layer B when the image IM10 is input to the learner LE.

After that, the generating apparatus 100 generates a combination image by combining the obtained intermediate images together (step S104). In FIG. 1, the generating apparatus 100 generates the combination image CM10 by combining together the intermediate images MM11 to MM19 included in the group of intermediate images MG10. For example, the generating apparatus 100 may generate the combination image CM10 by combining together the intermediate images MM11 to MM19, while using Expression (5) above.

Figure 7:
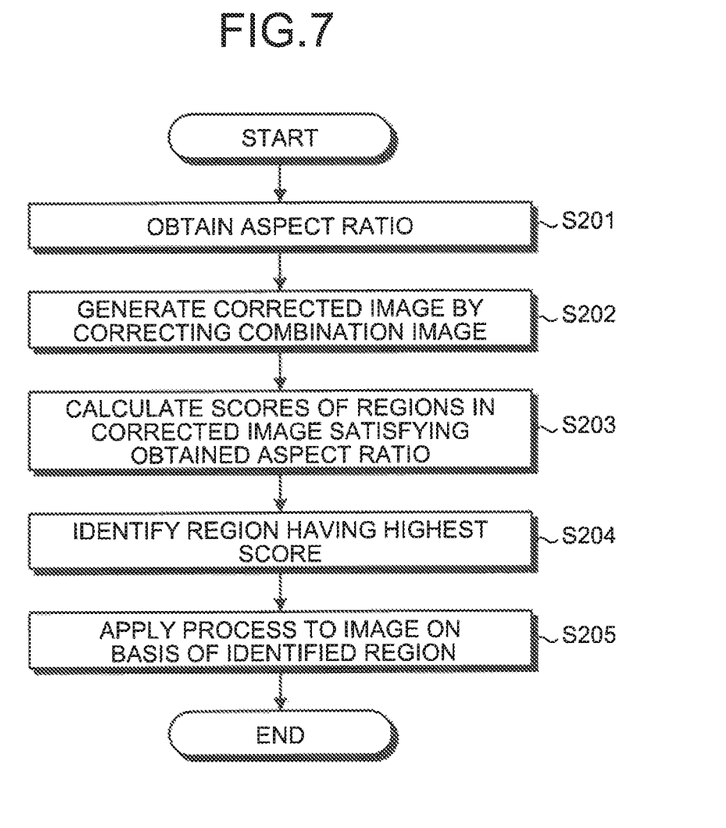
FIG. 7 is a flowchart illustrating an example of a process applied to an image according to the embodiment.

4. A Flow in a Procedure to Apply a Process to an Image by Using the Combination Image Next, a procedure to apply a process to an image by using the combination image performed by the generating apparatus 100 according to the embodiment will be explained with reference to FIG. 7. FIG. 7 is a flowchart illustrating an example of the process applied to an image according to the embodiment.

As illustrated in FIG. 7, the generating apparatus 100 obtains an aspect ratio (step S201). In FIG. 2, the generating apparatus 100 obtains the aspect ratio "1:1".

After that, the generating apparatus 100 generates a corrected image by correcting the combination image (step S202). In FIG. 2, the generating apparatus 100 generates the corrected image CM11 by resizing the combination image CM10.

Subsequently, the generating apparatus 100 calculates a score of each of the regions in the corrected image satisfying the obtained aspect ratio (step S203). For example, the generating apparatus 100 calculates scores by varying the region (the region of interest) included in the cut-out frame AR10, by enlarging/reducing the size of the cut-out frame AR10 and moving the position thereof around, while maintaining the aspect ratio of the cut-out frame AR10. For example, the generating apparatus 100 calculates the score of each of the regions of interest by using Expression (6) above.

After that, the generating apparatus 100 identifies the region having the highest score (step S204). For example, the generating apparatus 100 identifies a region to be cropped from the image IM10, on the basis of the scores calculated by using Expression (6) above.

Subsequently, the generating apparatus 100 applies a process to the image on the basis of the identified region (step S205). For example, the generating apparatus 100 identifies the region having the highest score among various regions included in the cut-out frame AR10 that are obtained by varying the cut-out frame AR10 and further crops the image on the basis of the identified region. For example, the generating apparatus 100 generates the processed image IM12 from the image IM10, by cropping the region in the image IM10 included in a cut-out frame corresponding to the cut-out frame AR11.

5. An Example of a Display of the Image

Figure 8:
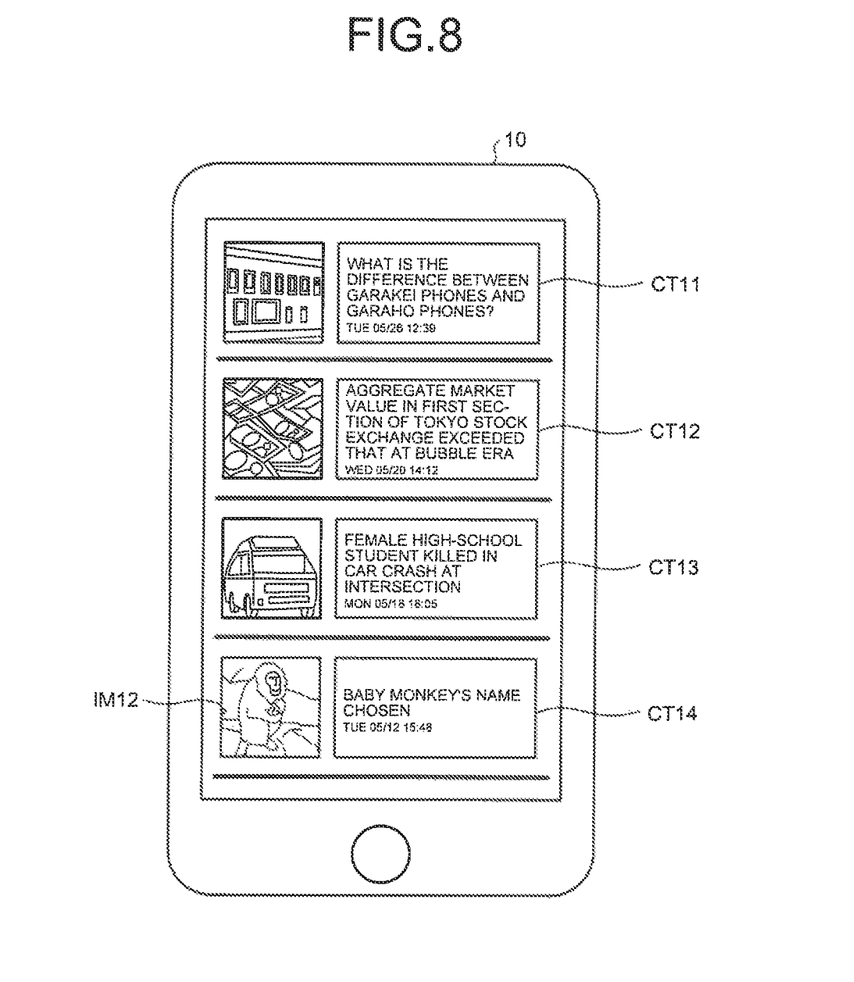
FIG. 8 is a drawing illustrating an example of a display of a processed image realized by a terminal apparatus according to the embodiment.

Next, an example of a display of the processed image IM12 generated by the generating apparatus 100 will be explained, with reference to FIG. 8. FIG. 8 is a drawing illustrating an example of a display of a processed image realized by a terminal apparatus according to the embodiment.

A terminal apparatus 10 illustrated in FIG. 8 displays pieces of content CT11 to CT14 distributed from a predetermined content distributing apparatus. In this situation, when the generating apparatus 100 is configured to distribute content, the pieces of content CT11 to CT14 may be transmitted from the generating apparatus 100 to the terminal apparatus 10.

In the example illustrated in FIG. 8, the processed image IM12 is used as an image for the piece of content CT14. In this manner, the processed image IM12 may be used as one of the images for the pieces of content that are displayed while being arranged next to one another along the scroll direction on the terminal apparatus 10. Thus, the processed image IM12 generated by the generating apparatus 100 is displayed on the terminal apparatus 10, which is realized with any of various types of apparatuses such as a smartphone. The generating apparatus 100 is able to generate the processed image IM12 that is appropriate regardless of what type of terminal apparatus the terminal apparatus 10 is.

6. A Generating Process Corresponding to the Aspect Ratio

Figure 9:
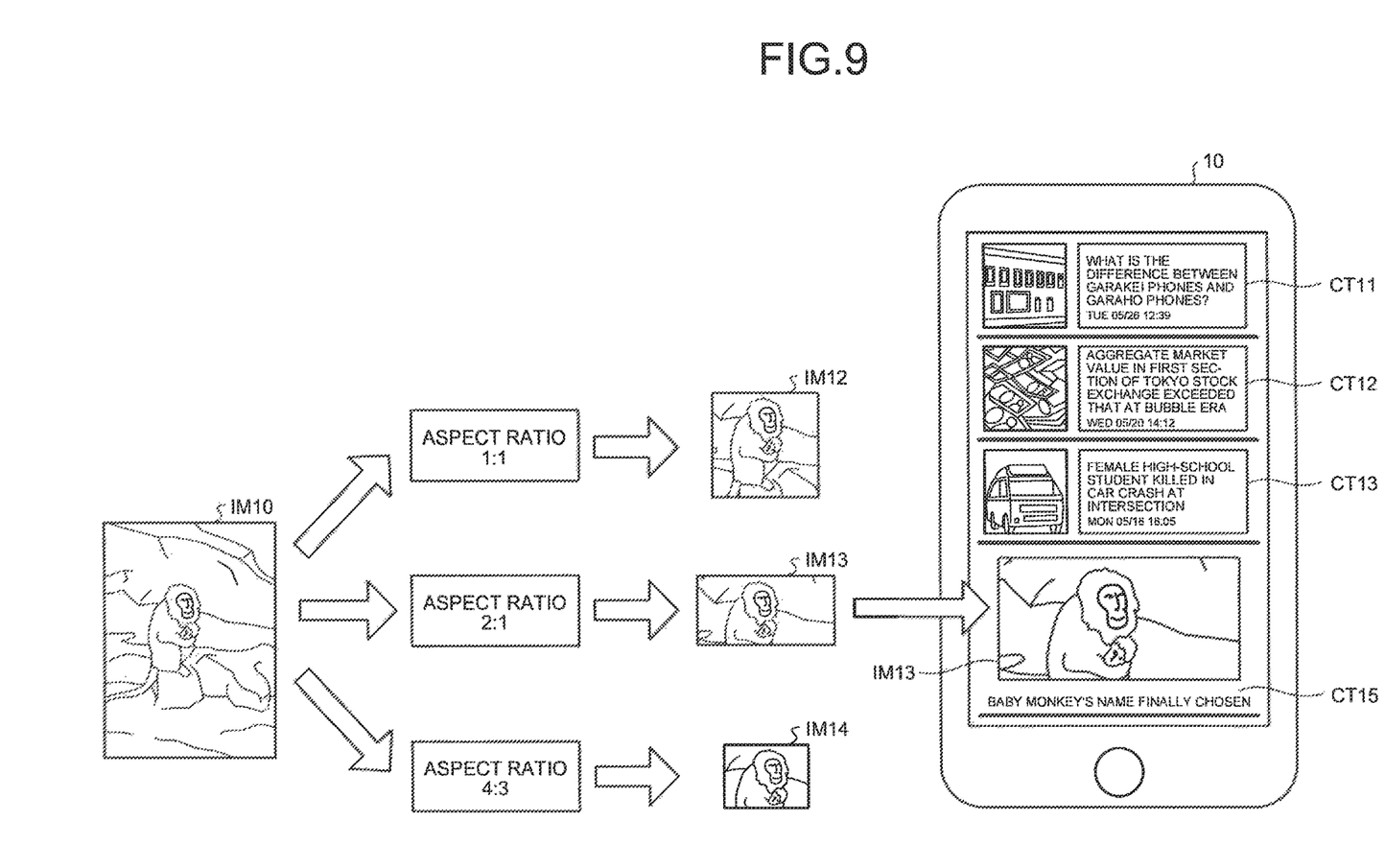
FIG. 9 is a diagram illustrating an example of a processed image generating process based on an aspect ratio according to the embodiment.

In the example above, the situation is explained in which the aspect ratio of the region cropped from the image is designated as "1:1". However, the aspect ratio does not necessarily have to be "1:1" and may be any other value. This technical point will be explained with reference to FIG. 9. FIG. 9 is a diagram illustrating an example of a processed image generating process based on an aspect ratio according to the embodiment.

In the example in FIG. 9, when the aspect ratio is designated as "1:1", the generating apparatus 100 generates the processed image IM12 of which the aspect ratio is "1:1", by cropping the image IM10. In this situation, the generating apparatus 100 performs the process of generating the processed image IM12 on the basis of the scores of the regions of interest, in the same manner as in FIG. 2.

Further, in the example in FIG. 9, when the aspect ratio is designated as "2:1", the generating apparatus 100 generates a processed image IM13 of which the aspect ratio is "2:1", by cropping the image IM10. In this situation, the generating apparatus 100 performs the process of generating the processed image IM13, on the basis of the scores of the regions of interest, in the same manner as in in FIG. 2. For instance, in the example in FIG. 9, the processed image IM13 is used as an image for the piece of content CT15. In this manner, the processed image IM13 may be used as one of the images for the pieces of content that are displayed while being arranged next to one another along the scroll direction on the terminal apparatus 10.

Further, in the example in FIG. 9, when the aspect ratio is designated as "4:3", the generating apparatus 100 generates a processed image IM14 of which the aspect ratio is "4:3" by cropping the image IM10. In this situation, the generating apparatus 100 performs the process of generating the processed image IM14 on the basis of the scores of the regions of interest, in the same manner as in FIG. 2. Further, although not illustrated in the drawings, the processed image IM14 may be used as one of the images for the pieces of contents that are displayed while being arranged next to one another along the scroll direction on the terminal apparatus 10. As explained herein, the generating apparatus 100 is able to generate the processed images corresponding to the various aspect ratios from the image IM10, in accordance with the designated aspect ratios.

7. Advantageous Effects

As explained above, the generating apparatus 100 according to the embodiment includes the obtaining unit 131 and the generating unit 132. The obtaining unit 131 obtains the intermediate images in the intermediate layer of the neural network that recognizes the number of objects (the quantity of objects) contained in the image. The generating unit 132 generates the combination image by combining together the intermediate images extracted by the obtaining unit 131.

By using this configuration, the generating apparatus 100 according to the embodiment obtains the intermediate images in the intermediate layer of the neural network. Further, the generating apparatus 100 generates the combination image by combining together the obtained intermediate images. In other words, the generating apparatus 100 appropriately generates the combination image by using the intermediate images from which the number of objects is recognized. In this manner, the generating apparatus 100 is able to generate the information used for appropriately recognizing the image, from the information available in the neural network.

Further, in the generating apparatus 100 according to the embodiment, the generating unit 132 generates the combination image by combining together the intermediate images to which the weight has been applied on the basis of the change in the recognition of the number of objects corresponding to the process applied to each of the intermediate images.

By using this configuration, the generating apparatus 100 according to the embodiment is able to appropriately generate the combination image by using the intermediate images in the intermediate layer of the neural network, by applying the weight in accordance with the change in the recognition ratio for the number of objects caused by the applied processes.

Further, the generating apparatus 100 according to the embodiment includes the processing unit 134. The processing unit 134 applies the process to the image, on the basis of the combination image generated by the generating unit 132.

By using this configuration, the generating apparatus 100 according to the embodiment is able to appropriately apply the process to the image on the basis of the combination image.

Further, in the generating apparatus 100 according to the embodiment, the processing unit 134 takes out a part of the image as the processed image on the basis of the combination image.

By using this configuration, the generating apparatus 100 according to the embodiment is able to appropriately take out (crop) the region from the image on the basis of the combination image.

Further, in the generating apparatus 100 according to the embodiment, the processing unit 134 takes out a part of the image as the processed image, by using the corrected image obtained by changing the aspect ratio of the combination image on the basis of the aspect ratio of the image.

By using this configuration, the generating apparatus 100 according to the embodiment is able to appropriately take out (crop) the region from the image on the basis of the corrected image.

Further, in the generating apparatus 100 according to the embodiment, the processing unit 134 takes out the processed image from the image, on the basis of the feature values in the corrected image.

By using this configuration, the generating apparatus 100 according to the embodiment is able to appropriately take out (crop) the region from the image, on the basis of the feature values in the region included in the corrected image.

Further, in the generating apparatus 100 according to the embodiment, the processing unit 134 takes out the processed image from the image, on the basis of the scores calculated from the feature values in the corrected image.

By using this configuration, the generating apparatus 100 according to the embodiment is able to appropriately take out (crop) the region from the image, on the basis of the scores calculated from the feature values of the region included in the corrected image.

Further, in the generating apparatus 100 according to the embodiment, the processing unit 134 takes out the processed image from the image, on the basis of the scores calculated from the predetermined region in the corrected image and the feature values included in the predetermined region.

By using this configuration, the generating apparatus 100 according to the embodiment is able to appropriately take out (crop) the region from the image, on the basis of the scores calculated from the feature values in the predetermined region included in the corrected image.

Further, in the generating apparatus 100 according to the embodiment, the processing unit 134 takes out the processed image from the image, on the basis of the predetermined region formed by using the predetermined aspect ratio.

By using this configuration, the generating apparatus 100 according to the embodiment is able to appropriate take out (crop) the region from the image, on the basis of the scores calculated from the feature values in the predetermined region formed by using the predetermined aspect ratio.

Further, in the generating apparatus 100 according to the embodiment, the obtaining unit 131 obtains the intermediate images in the intermediate layer of the neural network that performs the convolution process and the pooling process.

By using this configuration, the generating apparatus 100 according to the embodiment obtains the intermediate images in the intermediate layer of the Convolutional Neural Network (CNN). Accordingly, the generating apparatus 100 is able to appropriately generate the combination image by using the intermediate images in the intermediate layer of the neural network (the CNN).

8. A Hardware Configuration

Figure 10:
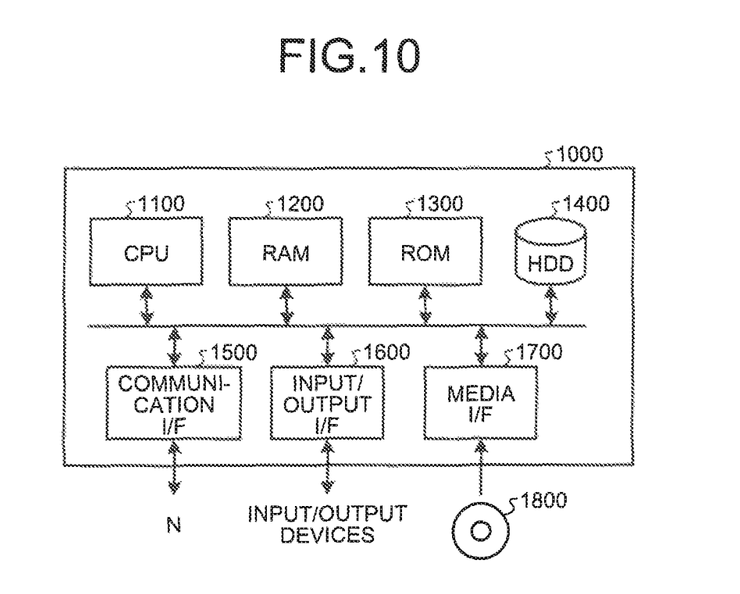
FIG. 10 is a hardware diagram illustrating an example of a computer that realizes functions of the generating apparatus.

The generating apparatus 100 according to the embodiment described above may be realized by a computer 1000 configured as illustrated in FIG. 10, for example. FIG. 10 is a hardware diagram illustrating an example of the computer that realizes functions of the generating apparatus 100. The computer 1000 includes a CPU 1100, a RAM 1200, a Read-Only Memory (ROM) 1300, a Hard Disk Drive (HDD) 1400, a communication interface (I/F) 1500, an input/output interface (I/F) 1600, and a media interface (I/F) 1700.

The CPU 1100 is configured to control various functional units by operating on the basis of computer programs (hereinafter, "programs") each of which is stored in either the ROM 1300 or the HDD 1400. The ROM 1300 stores therein a boot program executed by the CPU 1100 when the computer 1000 is started up, as well as programs and the like that are dependent on the hardware of the computer 1000.

The HDD 1400 stores therein the programs executed by the CPU 1100 and data and the like used by the executed programs. The communication interface 1500 is configured to receive data from another device via a network N, to forward the received data to the CPU 1100, and to transmit data generated by the CPU 1100 to another device via the network N.

The CPU 1100 is configured to control, via the input/output interface 1600, output devices such as a display device and a printer, as well as input devices such as a keyboard and a mouse. The CPU 1100 obtains data from the input devices via the input/output interface 1600. Further, the CPU 1100 outputs generated data to the output devices via the input/output interface 1600.

The media interface 1700 is configured to read a program or data stored in a recording medium 1800 and to provide the read program or data for the CPU 1100 via the RAM 1200. The CPU 1100 loads the program from the recording medium 1800 into the RAM 1200 via the media interface 1700 and executes the loaded program. For example, the recording medium 1800 may be an optical recording medium such as a Digital Versatile Disk (DVD) or a Phase change rewritable Disk (PD), an opto-magnetic recording medium such as a Magneto-Optical (MO) disk, a tape medium, a magnetic recording medium, a semiconductor memory, or the like.

For example, when the computer 1000 functions as the generating apparatus 100 according to the embodiment, the CPU 1100 included in the computer 1000 realizes the functions of the controlling unit 130 by executing programs loaded into the RAM 1200. The CPU 1100 included in the computer 1000 executes these programs by reading the programs from the recording medium 1800. Alternatively, the CPU 1100 may obtain these programs from another apparatus via the network N.

Some of the embodiments of the present application have thus been explained in detail, with reference to the accompanying drawings; however, the described embodiments are only examples. It is possible to carry out the present invention not only in the embodiments described in the sections disclosing the invention, but also in other embodiments obtained by applying various modifications and improvements thereto on the basis of knowledge of a person skilled in the art.

9. Others

With regard to the processes explained in the embodiments above, it is acceptable to manually perform all or a part of the processes described as being performed automatically. Conversely, by using a method that is publicly known, it is also acceptable to automatically perform all or a part of the processes described as being performed manually. Further, unless noted otherwise, it is acceptable to arbitrarily modify any of the processing procedures, specific names, and various information including various types of data and parameters that are presented in the above text and the drawings. For example, the various types of information illustrated in the drawings are not limited by the illustrated pieces of information.

The constituent elements of the devices and the apparatuses illustrated in the drawings are based on functional concepts. Thus, it is not necessary to physically configure the constituent elements as indicated in the drawings. In other words, the specific modes of distribution and integration of the devices and the apparatuses are not limited to those illustrated in the drawings. It is acceptable to functionally or physically distribute or integrate all or a part of the devices and the apparatuses in any arbitrary units, depending on various loads and the status of use.

Further, it is possible to combine together any of the embodiments described above as appropriate, as long as no conflict arises among the contents of the processes.

Further, the terms "section", "module", and "unit" used in the above explanations may be replaced with "means" or "circuit". For example, the obtaining unit may alternatively be referred to as an obtaining means or an obtaining circuit.

According to at least one aspect of the embodiments, an advantageous effect is achieved where it is possible to generate the information used for appropriately recognizing the image, from the information available in the neural network.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A generating apparatus comprising:
a processor programmed to:
obtain intermediate images in an intermediate layer of a neural network that recognizes a quantity of objects contained in an image; and
generate a combination image by combining together the obtained intermediate images to which a weight has been applied based on a change in recognition of the quantity of objects corresponding to a process applied to each of the intermediate images.

2. The generating apparatus according to claim 1, wherein the processor is programmed to:
apply a process to the image based on the generated combination image.

3. The generating apparatus according to claim 2, wherein the processor is programmed to:
remove a part of the image as a processed image based on the generated combination image.

4. The generating apparatus according to claim 3, wherein the processor is programmed to:
remove the part of the image as the processed image by using a corrected image that is obtained by changing an aspect ratio of the combination image based on an aspect ratio of the image.

5. The generating apparatus according to claim 4, wherein the processor is programmed to:
remove the processed image from the image based on a feature value in the corrected image.

6. The generating apparatus according to claim 5, wherein the processor is programmed to:
remove the processed image from the image based on a score calculated from the feature value in the corrected image.

7. A generating apparatus comprising:
a processor programmed to:
obtain intermediate images in an intermediate layer of a neural network that recognizes a quantity of objects contained in an image;
generate a combination image by combining together the obtained intermediate images; and
remove a part of the image as a processed image based on (i) a corrected image that is obtained by changing an aspect ratio of the generated combination image based on an aspect ratio of the image, (ii) a score calculated from a predetermined region in the corrected image, and (iii) a feature value included in the predetermined region in the corrected image.

8. The generating apparatus according to claim 7, wherein the processor is programmed to:
remove the processed image from the image based on the predetermined region formed by using a predetermined aspect ratio.

9. The generating apparatus according to claim 1, wherein processor is programmed to:
obtain the intermediate images in the intermediate layer of the neural network that performs a convolution process and a pooling process.

10. A generating method being implemented by a computer and comprising:
an obtaining step of obtaining intermediate images in an intermediate layer of a neural network that recognizes a quantity of objects contained in an image; and
a generating step of generating a combination image by combining together the obtained intermediate images to which a weight has been applied based on a change in recognition of the quantity of objects corresponding to a process applied to each of the intermediate images.

11. A non-transitory computer readable storage medium having stored therein a generating computer program that causes a computer to execute:
an obtaining process of obtaining intermediate images in an intermediate layer of a neural network that recognizes a quantity of objects contained in an image; and
a generating process of generating a combination image by combining together the obtained intermediate images to which a weight has been applied based on a change in recognition of the quantity of objects corresponding to a process applied to each of the intermediate images.

* * * * *